United States Patent
Doolittle et al.

(10) Patent No.: US 6,738,027 B1
(45) Date of Patent: May 18, 2004

(54) METHOD AND APPARATUS FOR CONFIGURATION USING A PORTABLE ELECTRONIC CONFIGURATION DEVICE

(75) Inventors: Robert A. Doolittle, Menlo Park, CA (US); James G. Hanko, Redwood City, CA (US); Brian Gillespie, Dublin (IE)

(73) Assignee: Sun Microsystems, Inc., Palo Alto, CA (US)

( * ) Notice: Subject to any disclaimer, the term of this patent is extended or adjusted under 35 U.S.C. 154(b) by 320 days.

(21) Appl. No.: 09/691,476

(22) Filed: Oct. 17, 2000

(51) Int. Cl.[7] .................................................. G09G 5/00
(52) U.S. Cl. ........................ 345/1.1; 345/1.3; 345/903
(58) Field of Search ........................ 345/1.3, 1.1, 903; 348/839, 840

(56) References Cited

U.S. PATENT DOCUMENTS

| | | | |
|---|---|---|---|
| 5,523,769 A | * 6/1996 | Lauer et al. ................ 345/1 |
| 5,553,314 A | * 9/1996 | Grube et al. ................ 455/514 |
| 5,796,376 A | * 8/1998 | Banks ........................ 345/82 |
| 5,923,307 A | * 7/1999 | Hogle, IV .................. 345/4 |
| 6,084,553 A | * 7/2000 | Walls et al. ................. 345/1 |
| 6,088,005 A | * 7/2000 | Walls et al. ................. 345/4 |
| 6,150,996 A | * 11/2000 | Nicholson et al. ........... 345/1 |
| 6,232,932 B1 | * 5/2001 | Thorner ..................... 345/1 |

\* cited by examiner

*Primary Examiner*—Michael Razavi
*Assistant Examiner*—Faranak Fouladi
(74) *Attorney, Agent, or Firm*—O'Melveny & Myers LLP

(57) ABSTRACT

The present invention provides a method and apparatus for configuration using a portable electronic configuration device. The portable device is attached to an unconfigured electronic device. The portable device causes the unconfigured device to send configuration data to a coupled device. The coupled device uses the data to configure the unconfigured device.

13 Claims, 14 Drawing Sheets

Configuration Process

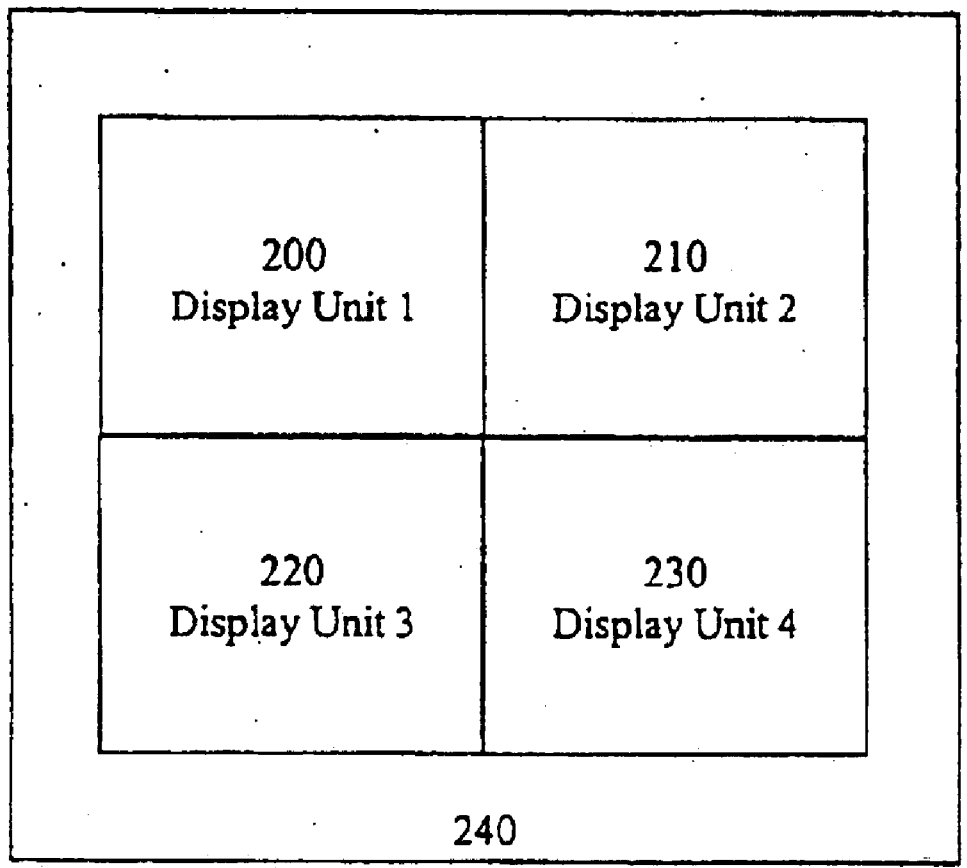
Figure 2: Multi-Headed Display

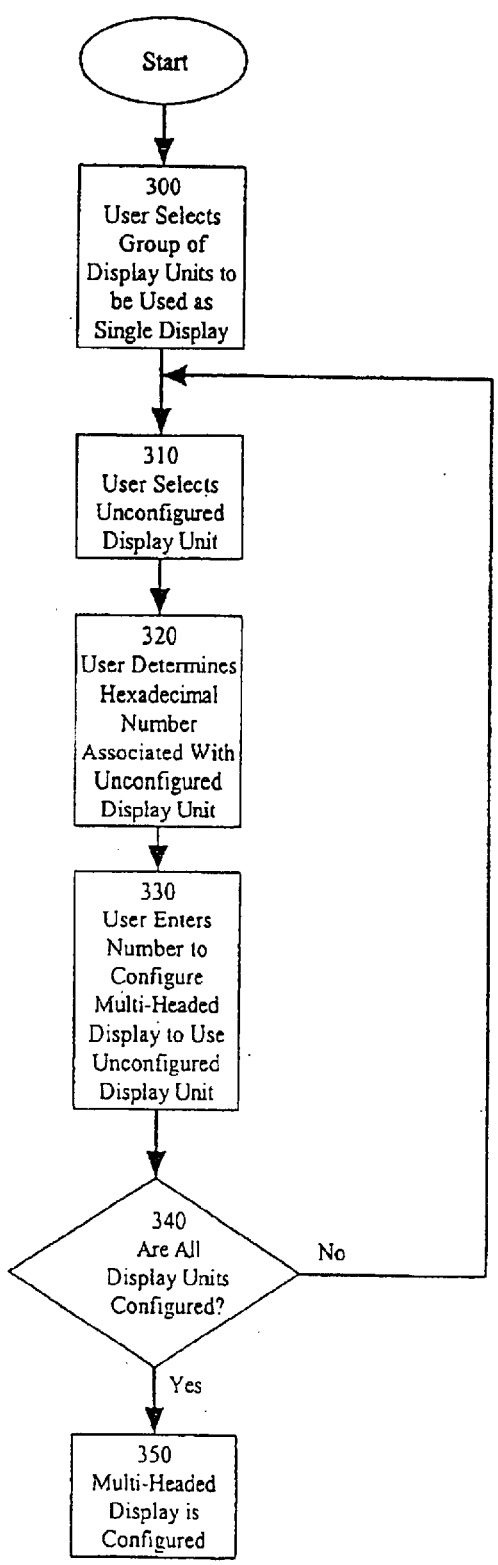
Figure 3: Configuring a Multi-Headed Display
PRIOR ART

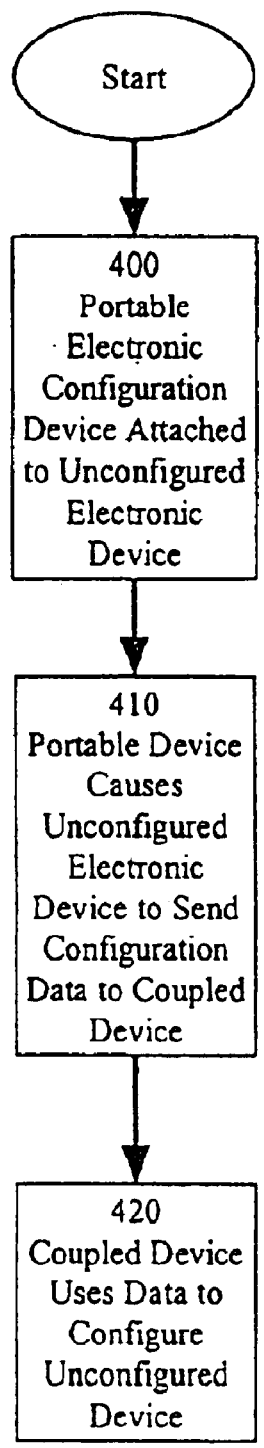
Figure 4: Configuration Process

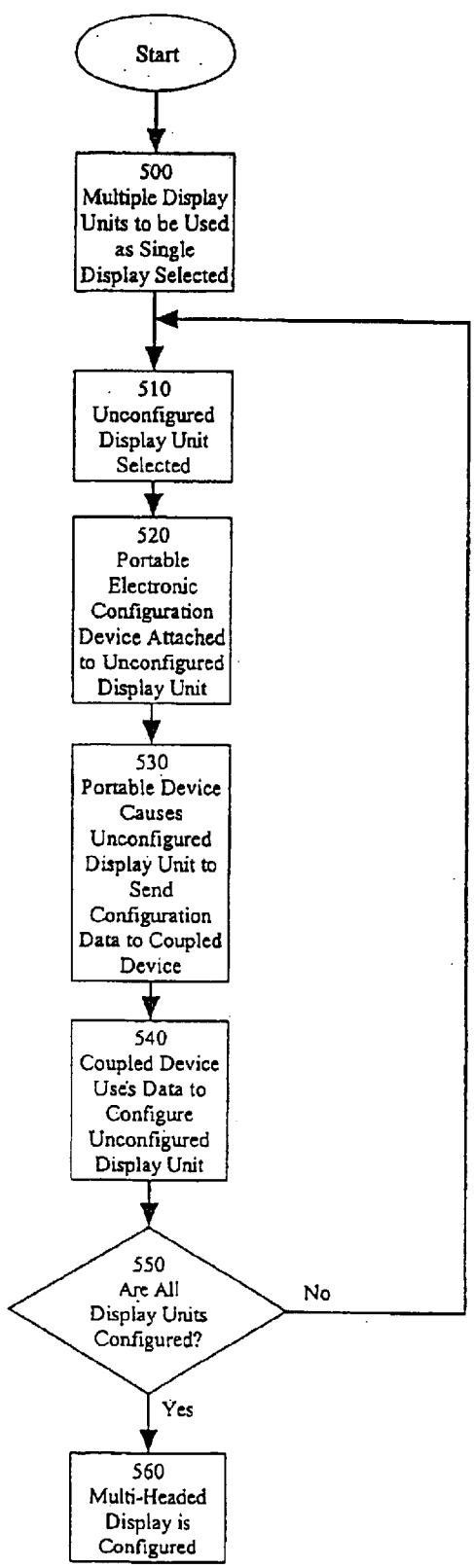
Figure 5: Configuring a Multi-Headed Display

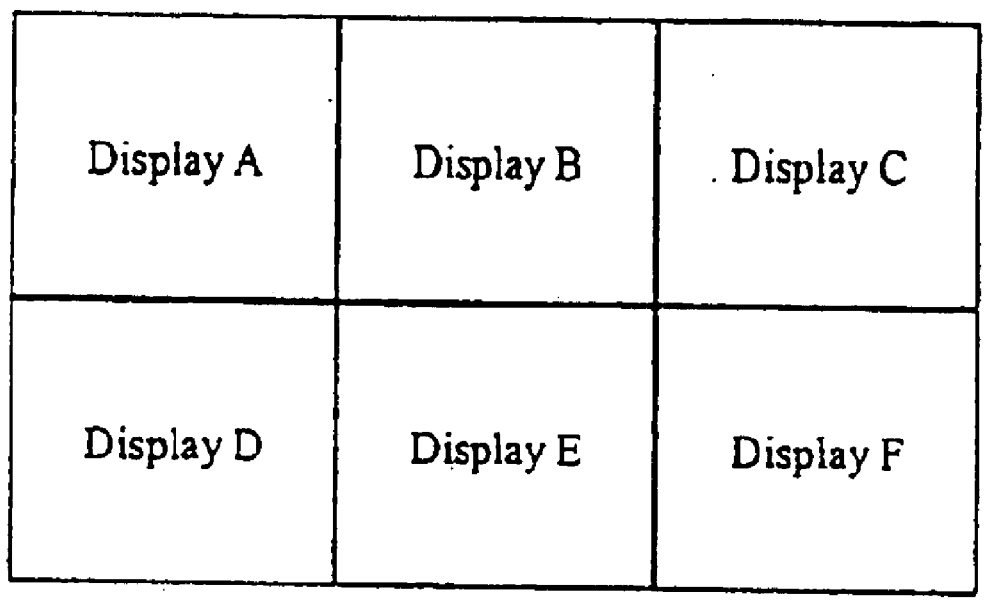
Figure 6A: Multi-Headed Display

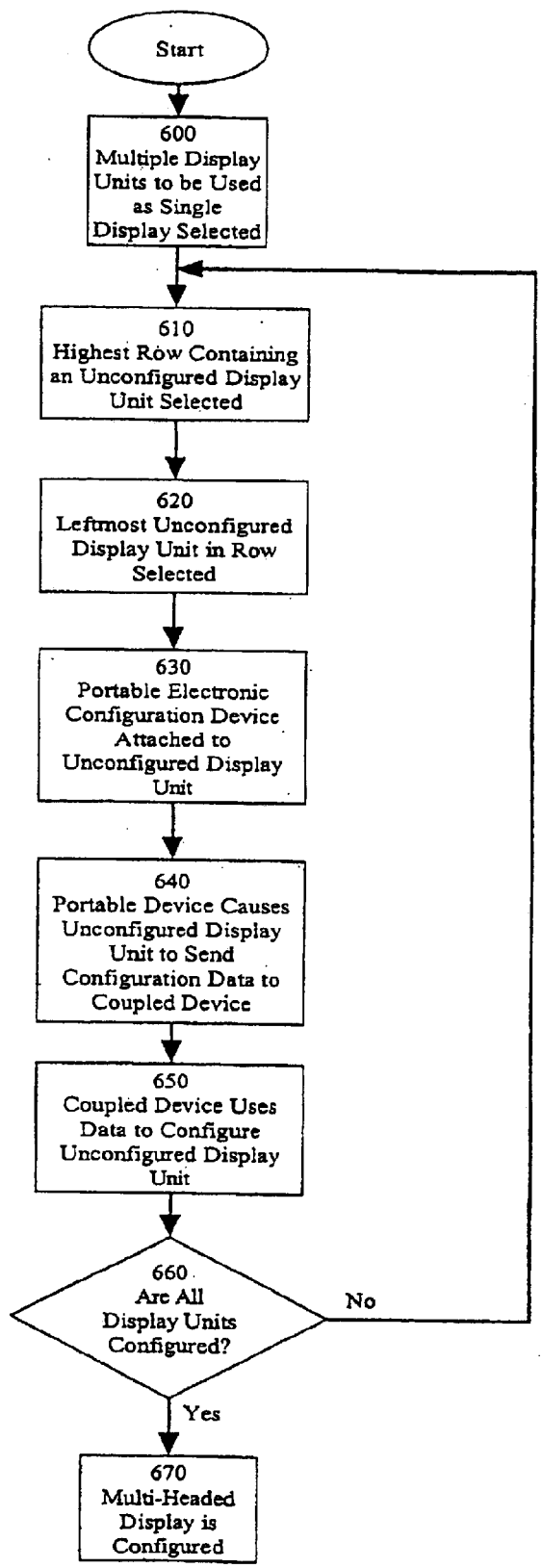
Figure 6B: Configuring a Multi-Headed Display

Figure 9: HID

Figure 10: HID Single Chip Implementation

Figure 11: Configuring a Multi-Headed Display in a Thin Client Topology

Figure 12: Configuring a Display Unit of a Multi-Headed Display

METHOD AND APPARATUS FOR CONFIGURATION USING A PORTABLE ELECTRONIC CONFIGURATION DEVICE

BACKGROUND OF THE INVENTION

1. Field of the Invention

The present invention relates to the field of computer configuration, and in particular to a method and apparatus for configuration using a portable electronic configuration device.

Sun, Sun Microsystems, the Sun logo, Solaris and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

When computing in a network, it is often the case that devices on the network are configured or re-configured to achieve a desired behavior. Current configuration schemes are inadequate, specifically when they require a user to manually enter complex configuration data. Before further discussing the drawbacks of current schemes, an application architecture where this problem typically occurs is described below.

Multi-Tier Application Architecture

In the multi-tier application architecture, a client communicates requests to a server for data, software and services, for example, and the server responds to the requests. The server's response may entail communication with a database management system for the storage and retrieval of data.

The multi-tier architecture includes at least a database tier that includes a database server, an application tier that includes an application server and application logic (i.e., software application programs, functions, etc.), and a client tier. The database server responds to application requests received from the client. The application server forwards data requests to the database server.

FIG. 1 provides an overview of a multi-tier architecture. Client tier 100 typically consists of a computer system that provides a graphic user interface (GUI) generated by a client 110, such as a browser or other user interface application. Conventional browsers include Internet Explorer and Netscape Navigator, among others. Client 110 generates a display from, for example, a specification of GUI elements (e.g., a file containing input, form, and text elements defined using the Hypertext Markup Language (HTML)) and/or from an applet (i.e., a program such as a program written using the Java™ programming language, or other platform independent programming language, that runs when it is loaded by the browser).

Further application functionality is provided by application logic managed by application server 120 in application tier 130. The apportionment of application functionality between client tier 100 and application tier 130 is dependent upon whether a "thin client" or "thick client" topology is desired. In a thin client topology, the client tier (i.e., the end user's computer) is used primarily to display output and obtain input, while the computing takes place in other tiers. A thick client topology, on the other hand, uses a more conventional general purpose computer having processing, memory, and data storage abilities. Database tier 140 contains the data that is accessed by the application logic in application tier 130. Database server 150 manages the data, its structure and the operations that can be performed on the data and/or its structure.

Application server 120 can include applications such as a corporation's scheduling, accounting, personnel and payroll applications, for example. Application server 120 manages requests for the applications that are stored therein. Application server 120 can also manage the storage and dissemination of production versions of application logic. Database server 150 manages the database(s) that manage data for applications. Database server 150 responds to requests to access the scheduling, accounting, personnel and payroll applications' data, for example.

Connection 160 is used to transmit data between client tier 100 and application tier 130, and may also be used to transfer the application logic to client tier 100. The client tier can communicate with the application tier via, for example, a Remote Method Invocator (RMI) application programming interface (API) available from Sun Microsystems™. The RMI API provides the ability to invoke methods, or software modules, that reside on another computer system. Parameters are packaged and unpackaged for transmittal to and from the client tier. Connection 170 between application server 120 and database server 150 represents the transmission of requests for data and the responses to such requests from applications that reside in application server 120.

Elements of the client tier, application tier and database tier (e.g., client 110, application server 120 and database server 150) may execute within a single computer. However, in a typical system, elements of the client tier, application tier and database tier may execute within separate computers interconnected over a network such as a LAN (local area network) or WAN (wide area network).

Computer Configuration

Computer systems typically must be configured to work properly. One aspect of configuration involves determining an address of a new device and instructing another device to communicate with the new device at its address. For example, a user may wish to instruct a computer system to display output on multiple display units, termed a "multi-headed" group. A prior art method requires a user to determine a hexadecimal number for each display unit and manually enter the number to configure the display properly. This process is unnatural to a person, difficult to perform and introduces the possibility of human error in configuring the display properly.

FIG. 2 illustrates a multi-headed display. Display units 1 (200), 2 (210), 3 (220) and 4 (230) act as a single display (240). The multi-headed display can simply increase the size of images normally displayed on one display unit. Thus, an image normally displayed on one unit would appear 4 times larger on the multi-headed unit. In this case, display unit 1 displays the upper left quadrant of the display. Likewise, display unit 2 displays the upper right quadrant of the display. Similarly, display unit 3 displays the lower left quadrant of the display, and display unit 4 displays the lower right quadrant of the display.

The multi-headed display of FIG. 2 can also effectively increase the displayed work area by keeping images at a size appropriate for a single display unit. Thus, a user gains an additional 3 display units of workspace to display open documents. Thus, at the resolution a user displays one program in a single display unit, the multi-headed display allows the user to display four similar programs.

FIG. 3 illustrates a prior art method of configuring a multi-headed display. At step 300, a user selects a group of display units to be used as a single display. At step 310, the user selects an unconfigured display unit. At step 320, the user determines a hexadecimal number associated with the unconfigured display unit. At step 330, the user enters the hexadecimal number to configure the multi-headed display to use the unconfigured display unit. At step 340, it is determined whether any unconfigured display units remain. If no unconfigured display units remain, at step 350, the multi-headed display is configured. If an unconfigured display unit remains, the process repeats at step 310.

SUMMARY OF THE INVENTION

The present invention provides a method and apparatus for configuration using a portable electronic configuration device. In one embodiment, the portable device is attached to an unconfigured electronic device. The portable device causes the unconfigured device to send configuration data to a coupled device. The coupled device, then, uses the data to configure the unconfigured device.

In one embodiment, the unconfigured device is a multi-headed display. A portable electronic configuration device is attached to each unconfigured display unit which is to be part of the multi-headed display. The portable device causes the unconfigured display unit to send configuration data to a coupled device. The coupled device uses the data to configure the unconfigured display unit.

In one embodiment, rows of display units in the multi-headed display have the same number of columns. In one embodiment, the rows of display units are configured top to bottom. In another embodiment, each row of display units is configured left to right. Other embodiments have other orderings for configuration of display units. In one embodiment, the multi-headed display is part of a thin client topology.

BRIEF DESCRIPTION OF THE DRAWINGS

These and other features, aspects and advantages of the present invention will become better understood with regard to the following description, appended claims and accompanying drawings where:

FIG. 2 is a block drawing of a multi-headed display.

FIG. 3 is a flow diagram of a prior art method of configuring a multi-headed display.

FIG. 4 is a flow diagram of a configuration process in accordance with one embodiment of the present invention.

FIG. 5 is a flow diagram of a process of configuring a multi-headed display in accordance with one embodiment of the present invention.

FIG. 6A is a block diagram of a multi-headed display.

FIG. 6B is a flow diagram of a process of configuring a multi-headed display in accordance with one embodiment of the present invention.

DETAILED DESCRIPTION OF THE INVENTION

Figure 1:
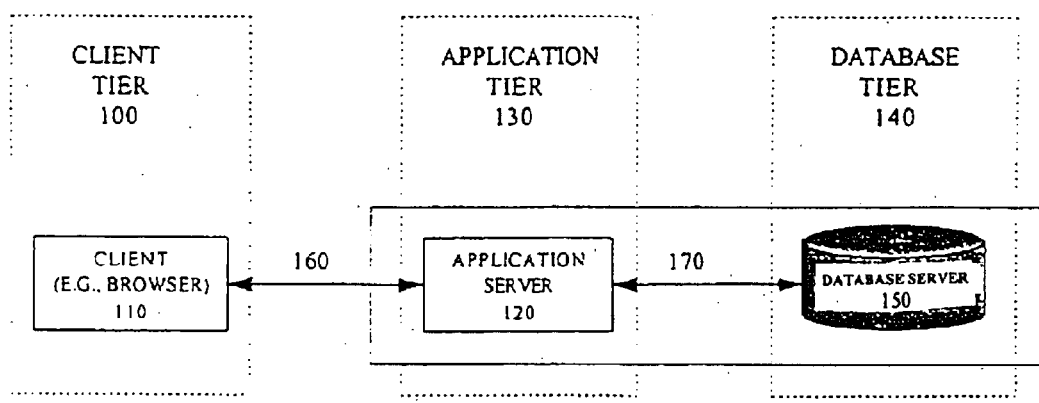
FIG. 1 is a block diagram of a multi-tier architecture.

The invention is a method and apparatus for configuration using a portable electronic configuration device. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Portable Electronic Configuration Device

One embodiment of the present invention configures electronic devices using a portable electronic configuration device. The portable device is attached to an unconfigured electronic device. The portable device causes the unconfigured device to send configuration data to a coupled central configuration device. The coupled central configuration device uses the data to configure the unconfigured device.

FIG. 4 illustrates the configuration process in accordance with one embodiment of the present invention. At step 400, a portable electronic configuration device is attached to an unconfigured electronic device. At step 410, the portable device causes the unconfigured electronic device to send configuration data to a coupled central configuration device. At step 420, the coupled central configuration device uses the data to configure the unconfigured device.

Multi-Headed Displays

One embodiment of the present invention is used to configure a multi-headed display. A portable electronic configuration device is attached to each unconfigured display unit which is to be part of the multi-headed display. The portable device causes the unconfigured display unit to send configuration data to a coupled device. The coupled device, then, uses the data to configure the unconfigured display unit.

FIG. 5 illustrates the process of configuring a multi-headed display in accordance with one embodiment of the present invention. At step 500, multiple display units to be used as a single display are selected. At step 510, an unconfigured display unit is selected. At step 520, a portable electronic configuration device is attached to the unconfigured display unit. At step 530, the portable device causes the unconfigured display unit to send configuration data to a coupled device.

At step 540, the coupled device uses the data to configure the unconfigured display unit. At step 550, it is determined whether any unconfigured display units remain. If no unconfigured display units remain, at step 560, the multi-headed display is configured. If an unconfigured display unit remains, the process repeats at step 510.

In one embodiment, the display units of the multi-headed display form a rectangle. One embodiment requires the rows of display units be configured top to bottom. Another embodiment requires each row of display units to be configured left to right. Other embodiments have other orderings for configuration of display units.

FIG. 6A illustrates a multi-headed display. Displays A, B and C form the highest row. Displays D, E and F form the lowest row. Displays A and D are positioned in the leftmost column. Displays C and F are positioned in the rightmost column. Finally, displays B and E are positioned in the middle column.

In one embodiment, the display units are configured in accordance with a fixed topological ordering. FIG. 6B illustrates the process of configuring a multi-headed display in accordance with one embodiment of the present invention. At step 600, multiple display units to be used as a single display are selected. At step 610, the highest row of display units wherein the row contains an unconfigured display unit is selected. At step 620, the leftmost unconfigured display unit in the row is selected.

At step 630, a portable electronic configuration device is attached to the unconfigured display unit. At step 640, the portable device causes the unconfigured display unit to send configuration data to a coupled device. At step 650, the coupled device uses the data to configure the unconfigured display unit. At step 660, it is determined whether any unconfigured display units remain. If no unconfigured display units remain, at step 670, the multi-headed display is configured. If an unconfigured display unit remains, the process repeats at step 610.

If the process of FIG. 6B is applied to the multi-headed display of FIG. 6A, display A is configured first. Next, display B is configured. Display C is configured, next, followed by display D. Then, display E is configured. Finally, display F is configure.

Virtual Desktop System Architecture

Figure 7:
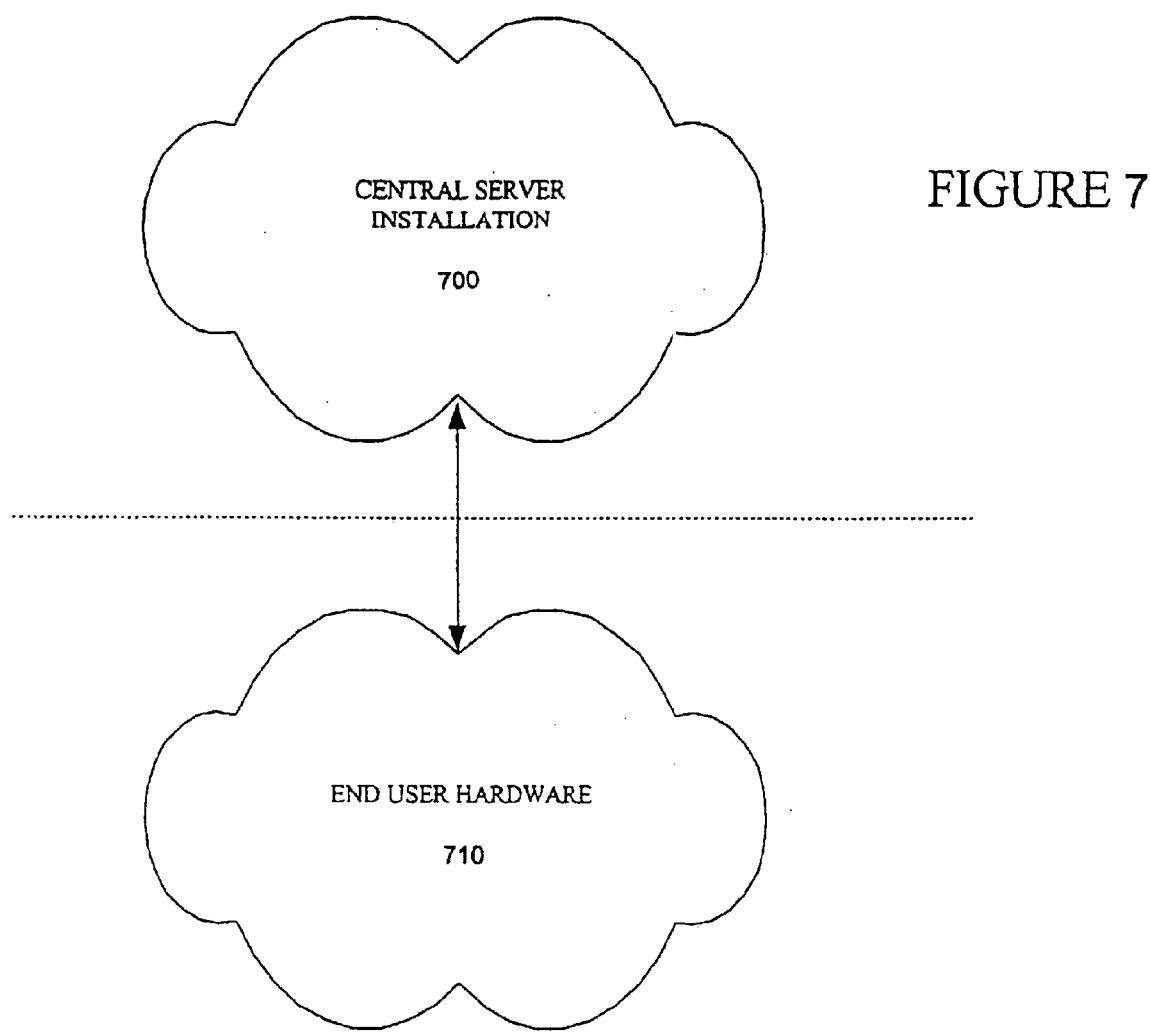
FIG. 7 is a block diagram of a thin client topology called a virtual desktop system architecture.

FIG. 7 shows an example of a thin client topology called a virtual desktop system architecture. The virtual desktop system architecture provides a re-partitioning of functionality between a central server installation 700 and end user hardware 710. Data and computational functionality are provided by data sources via a centralized processing arrangement. At the user end, all functionality is eliminated except that which generates output to the user (e.g., display and speakers), takes input from the user (e.g., mouse and keyboard) or other peripherals that the user may interact with (e.g., scanners, cameras, removable storage, etc.). All computing is done by the central data source and the computing is done independently of the destination of the data being generated. The output of the source is provided to a terminal, referred to here as a "Human Interface Device" (HID). The HID is capable of receiving the data and displaying the data.

Figure 8:
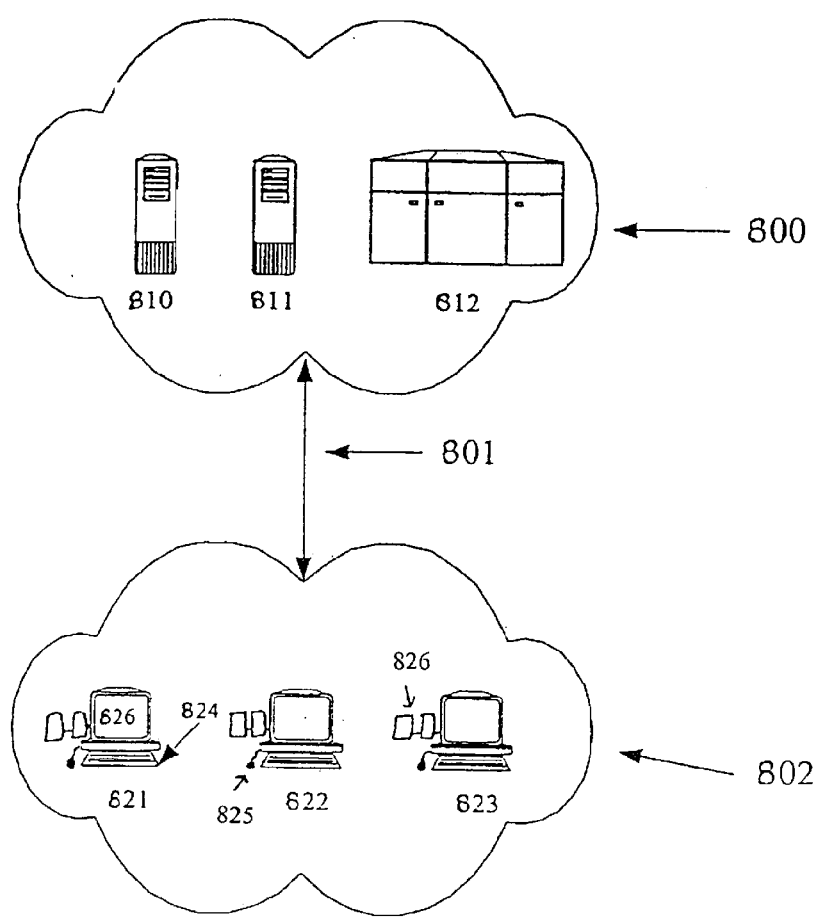
FIG. 8 is a block diagram of a virtual desktop system.

The functionality of the virtual desktop system is partitioned between a display and input device such as a remote system and associated display device, and data sources or services such as a host system interconnected to the remote system via a communication link. The display and input device is a human interface device (HID). The system is partitioned such that state and computation functions have been removed from the HID and reside on data sources or services. One or more services communicate with one or more HIDs through a communication link such as network. An example of such a system is illustrated in FIG. 8, wherein the system comprises computational service providers 800 communicating data through communication link 801 to HIDs 802.

The computational power and state maintenance is provided by the service providers or services. The services are not tied to a specific computer, but may be distributed over one or more traditional desktop systems such as described in connection with FIG. 9, or with traditional servers. One computer may have one or more services, or a service may be implemented by one or more computers. The service provides computation, state and data to HIDs and the service is under the control of a common authority or manager. In FIG. 8, the services are provided by computers 810, 811, and 812. In addition to the services, a central data source can provide data to the HIDs from an external source such as for example the Internet or world wide web. The data source can also broadcast entities such as those that broadcast data such as television and radio signals.

Examples of services include X11/Unix services, archived or live audio or video services, Windows NT service, Java program execution service and others. A service herein is a process that provides output data and response to user requests and input. The service handles communication with an HID currently used by a user to access the service. This includes taking the output from the computational service and converting it to a standard protocol for the HID. The data protocol conversion is handled by a middleware layer, such as the X11 server, the Microsoft Windows interface, video format transcoder, the OpenGL interface, or a variant of the java.awt.graphics class within the service producer machine. The service machine handles the translation to and from a virtual desktop architecture wire protocol described further below.

Each service is provided by a computing device optimized for its performance. For example, an Enterprise class machine could be used to provide X11/Unix service, a Sun MediaCenter could be used to provider video service, and a Hydra based NT machine could provide applet program execution services.

The service providing computer system can connect directly to the HIDs through the interconnect fabric. It is also possible for the service producer to be a proxy for another device providing the computational service, such as a database computer in a three-tier architecture, where the proxy computer might only generate queries and execute user interface code.

The interconnect fabric can comprise any of multiple suitable communication paths for carrying data between the services and the HIDs. In one embodiment the interconnect fabric is a local area network implemented as an Ethernet network. Any other local network may also be utilized. The invention also contemplates the use of wide area networks, the Internet, the world wide web, and others. The interconnect fabric may be implemented with a physical medium such as a wire or fiber optic cable, or it may be implemented in a wireless environment.

The interconnect fabric provides actively managed, low-latency, high-bandwidth communication between the HID and the services being accessed. One embodiment contemplates a single-level, switched network, with cooperative (as opposed to completing) network traffic. Dedicated or shared communications interconnects maybe used in the present invention.

The HID is the means by which users access the computational services provided by the services. FIG. 8 illustrates HIDs 821, 822 and 823. Each HID comprises a display 826, a keyboard 824, mouse 825, and audio speakers 826. The HID includes the electronics need to interface these devices to the interconnection fabric and to transmit to and receive data from the services.

Figure 9:
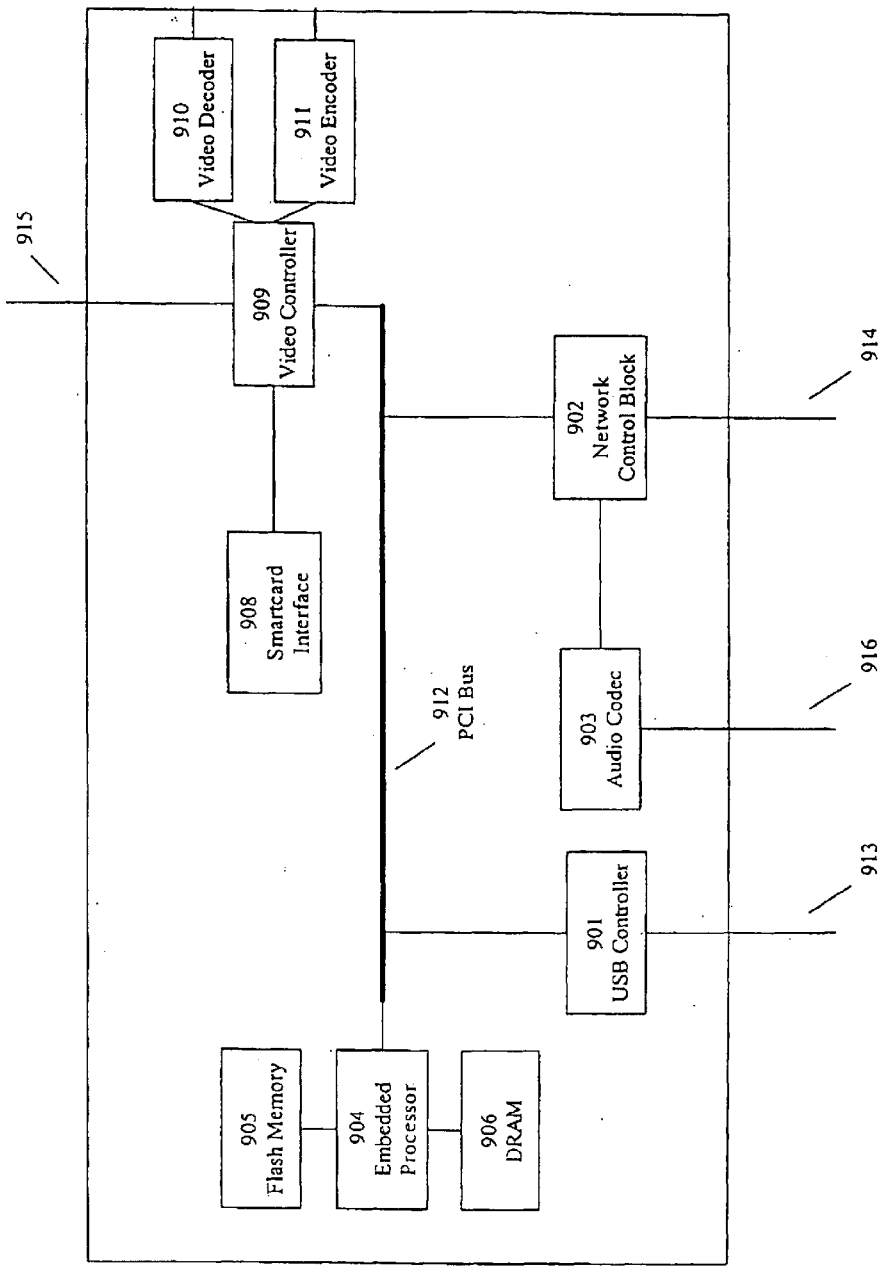
FIG. 9 is a block diagram of a human interface device.

A block diagram of an example embodiment of the HID is illustrated in FIG. 9. The components of the HID are coupled internally to a PCI bus 912. A network control block 902 communicates to the interconnect fabric, such as an Ethernet, through line 914. An audio codec 903 receives audio data on interface 916 and is coupled to network control block 902. USB data communication is provided on lines 913 to a USB controller 901. The HID further comprises an embedded processor 904 such as a Sparc2ep with coupled flash memory 905 and DRAM 906. The USB controller 901, the network controller 902 and the embedded processor 904 are all coupled to the PCI bus 912. A video controller 909, also coupled to the PCI bus 912, can include an ATI RagePro+ frame buffer controller which provides SVGA output on the line 915. NTSC data is provided in and out of the video controller through video decoder 910 and encoder 911 respectively. A smartcard interface 908 may also be coupled to the video controller 909.

Figure 10:
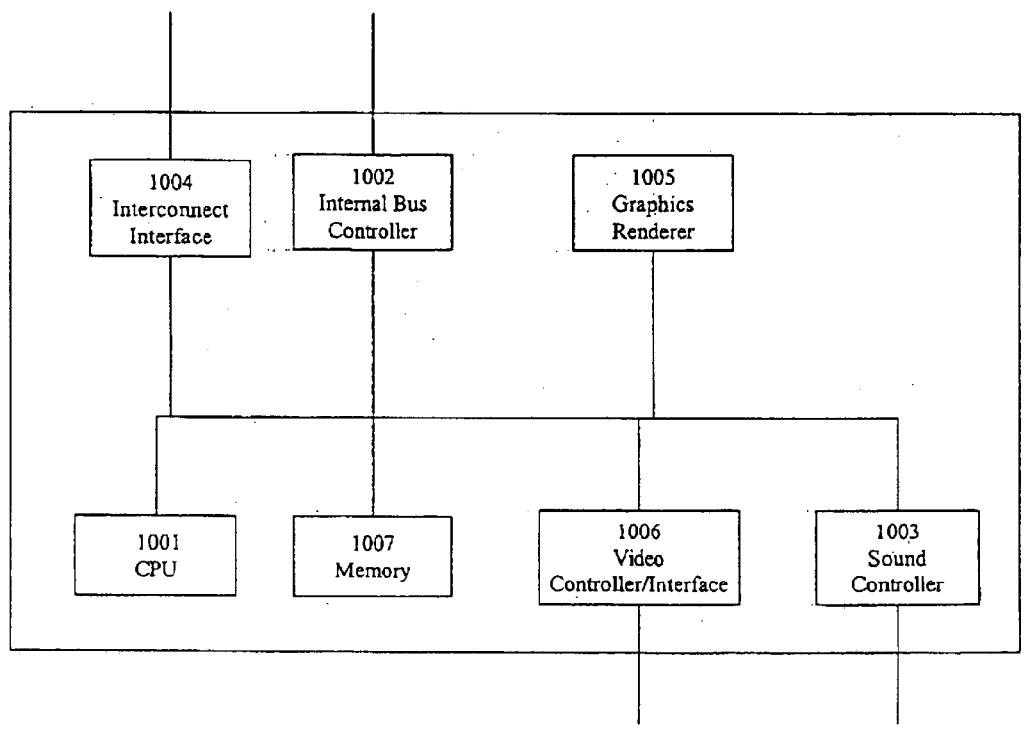
FIG. 10 is a block diagram of a human interface device.

Alternatively, the HID can comprise a single chip implementation as illustrated in FIG. 10. The single chip includes the necessary processing capability implemented via CPU 1001 and graphics renderer 1005. Chip memory 1007 is provided, along with video controller/interface 1006. An internal bus (USB) controller 1002 is provided to permit communication to a mouse, keyboard and other local devices attached to the HID. A sound controller 1003 and interconnect interface 1004 are also provided. The video interface shares memory 1007 with the CPU 1001 and graphics renderer 1005. The software used in this embodiment may reside locally in non-volatile memory or it can be loaded through the interconnection interface when the device is powered.

The operation of the virtual desktop system architecture is described in U.S. patent application Ser. No. 09/063,335, filed Apr. 20, 1998, entitled "Method and Apparatus for Providing A Virtual Desktop System Architecture" and assigned to the present assignee, and incorporated herein by reference.

Multi-Headed Display in Thin Client Topology

In one embodiment, the multi-headed display is part of a thin client topology. One display unit is termed the "primary unit." All user input (e.g., mouse actions) is collected from the primary unit. Other units of the multi-headed display are termed "secondary units."

Figure 11:
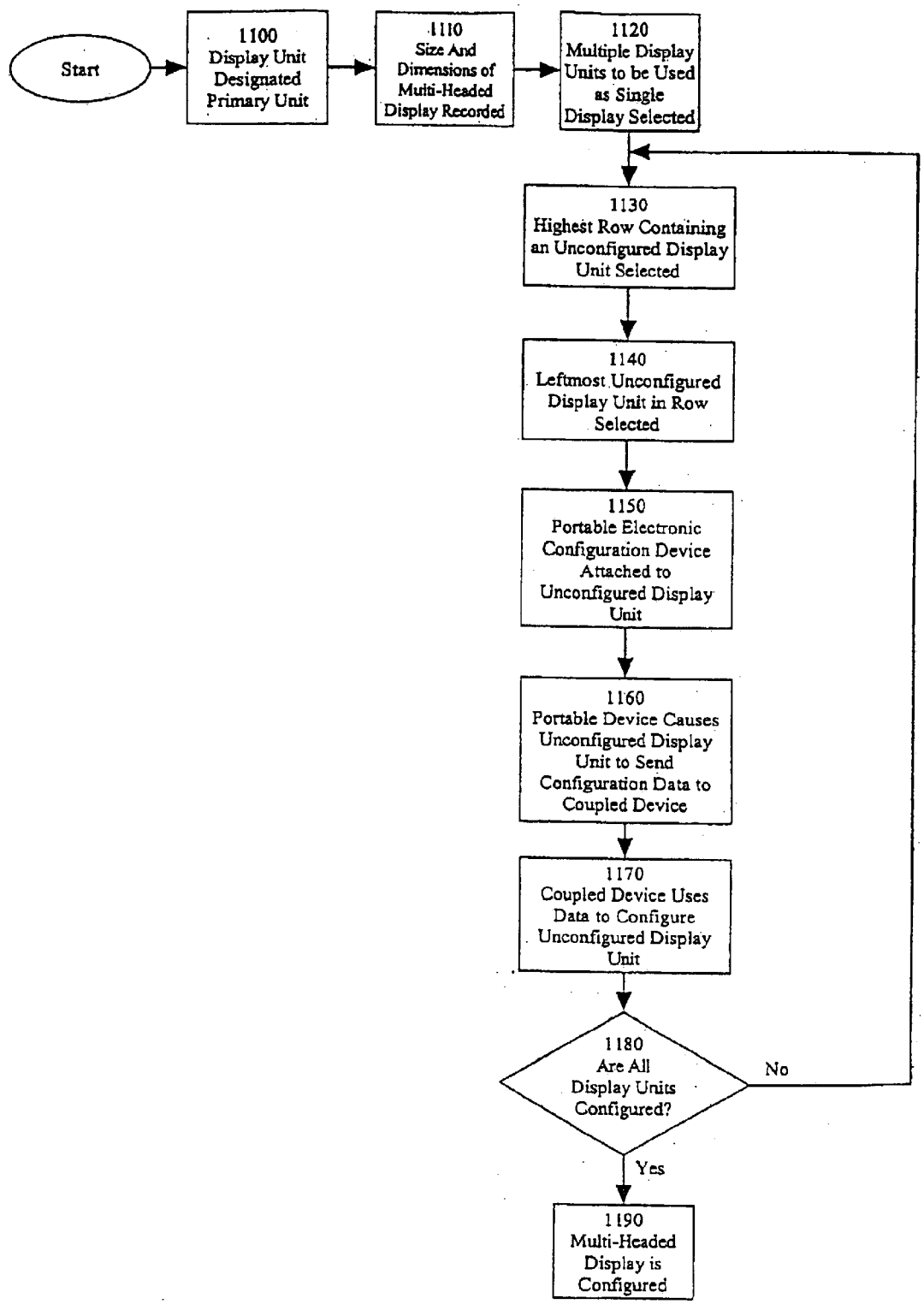
FIG. 11 is a flow diagram of a process of configuring a multi-headed display for a thin client topology in accordance with one embodiment of the present invention.

FIG. 11 illustrates the process of configuring a multi-headed display for a thin client topology in accordance with one embodiment of the present invention. At step 1100, a display unit is designated as the primary unit. The primary unit has the controlling keyboard and mouse for the multi-headed display. At step 1110, the size and dimensions of the multi-headed display are recorded. At step 1120, multiple display units to be used as a single display are selected.

At step 1130, the highest row of display units wherein the row contains an unconfigured display unit is selected. At step 1140, the leftmost unconfigured display unit in the row is selected. At step 1150, a portable electronic configuration device is attached to the unconfigured display unit. At step 1160, the portable device causes the unconfigured display unit to send configuration data to a coupled device. At step 1170, the coupled device uses the data to configure the unconfigured display unit.

At step 1180, it is determined whether any unconfigured display units remain. If no unconfigured display units remain, at step 1190, the multi-headed display is configured. If an unconfigured display unit remains, the process repeats at step 1130.

Figure 12:
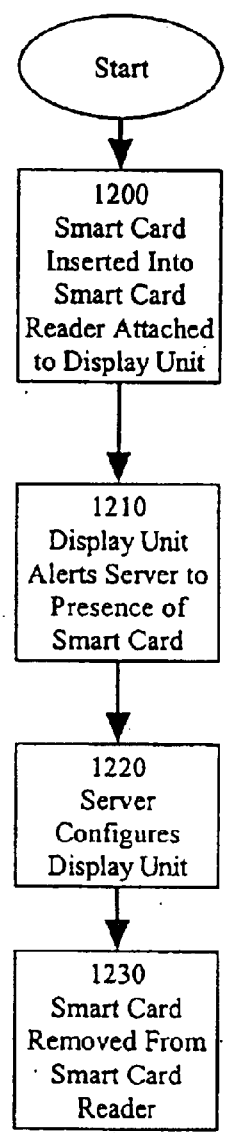
FIG. 12 is a flow diagram of the process of configuring a display unit of a multi-headed display in accordance with one embodiment of the present invention.

In one embodiment, the coupled device is the server in a thin client topology. In another embodiment, the portable electronic configuration unit is a smart card. FIG. 12 illustrates the process of configuring a display unit of a multi-headed display in accordance with one embodiment of the present invention. At step 1200, the smart card is inserted into a smart card reader attached to the display unit. At step 1210, the display unit alerts a server to the presence of the smart card. At step 1220, the server configures the display unit. At step 1230, the smart card is removed from the smart card reader.

Embodiment of Computer Execution Environment (Hardware)

Figure 13:
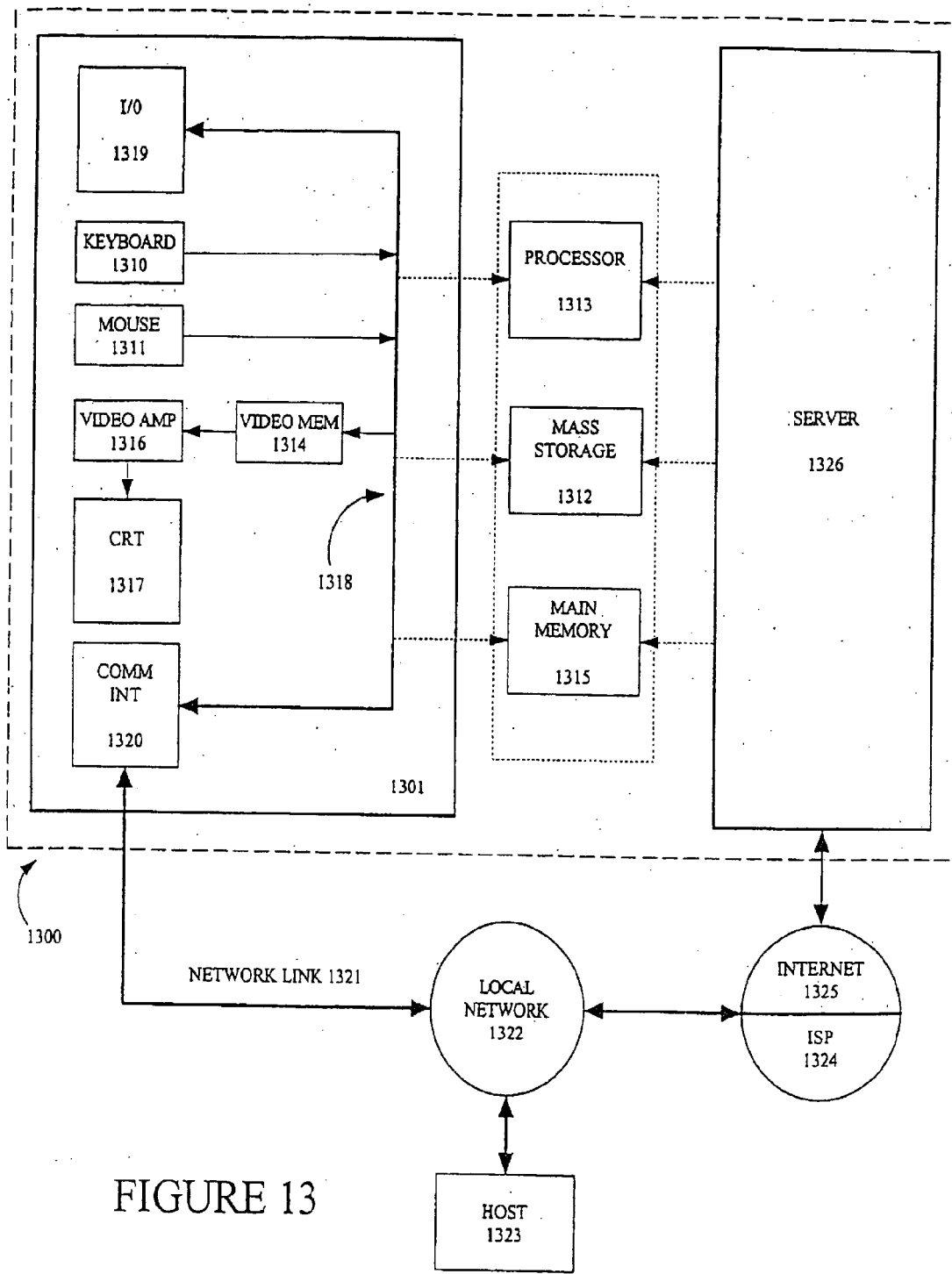
FIG. 13 is a block diagram of a general purpose computer.

An embodiment of the invention can be implemented as computer software in the form of computer readable program code executed in a general purpose computing environment such as environment 1300 illustrated in FIG. 13, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 1310 and mouse 1311 are coupled to a system bus 1318. The keyboard and mouse are for introducing user input to the computer system and communicating that user input to central processing unit (CPU) 1313. Other suitable input devices may be used in addition to, or in place of, the mouse 1311 and keyboard 1310. I/O (input/output) unit 1319 coupled to bi-directional system bus 1318 represents such I/O elements as a printer, A/V (audio/video) I/O, etc.

Computer 1301 may include a communication interface 1320 coupled to bus 1318. Communication interface 1320 provides a two-way data communication coupling via a network link 1321 to a local network 1322. For example, if communication interface 1320 is an integrated services digital network (ISDN) card or a modem, communication interface 1320 provides a data communication connection to the corresponding type of telephone line, which comprises part of network link 1321. If communication interface 1320 is a local area network (LAN) card, communication interface 1320 provides a data communication connection via network link 1321 to a compatible LAN. Wireless links are also possible. In any such implementation, communication interface 1320 sends and receives electrical, electromagnetic or optical signals which carry digital data streams representing various types of information.

Network link 1321 typically provides data communication through one or more networks to other data devices. For example, network link 1321 may provide a connection through local network 1322 to local server computer 1323 or to data equipment operated by ISP 1324. ISP 1324 in turn provides data communication services through the world wide packet data communication network now commonly referred to as the "Internet" 1325. Local network 1322 and Internet 1325 both use electrical, electromagnetic or optical signals which carry digital data streams. The signals through the various networks and the signals on network link 1321 and through communication interface 1320, which carry the digital data to and from computer 1300, are exemplary forms of carrier waves transporting the information.

Processor 1313 may reside wholly on client computer 1301 or wholly on server 1326 or processor 1313 may have its computational power distributed between computer 1301 and server 1326. Server 1326 symbolically is represented in FIG. 13 as one unit, but server 1326 can also be distributed between multiple "tiers". In one embodiment, server 1326 comprises a middle and back tier where application logic executes in the middle tier and persistent data is obtained in the back tier. In the case where processor 1313 resides wholly on server 1326, the results of the computations performed by processor 1313 are transmitted to computer 1301 via Internet 1325, Internet Service Provider (ISP) 1324, local network 1322 and communication interface 1320. In this way, computer 1301 is able to display the results of the computation to a user in the form of output.

Computer 1301 includes a video memory 1314, main memory 1315 and mass storage 1312, all coupled to bi-directional system bus 1318 along with keyboard 1310, mouse 1311 and processor 1313. As with processor 1313, in various computing environments, main memory 1315 and mass storage 1312, can reside wholly on server 1326 or computer 1301, or they may be distributed between the two. Examples of systems where processor 1313, main memory 1315, and mass storage 1312 are distributed between computer 1301 and server 1326 include the thin-client computing architecture developed by Sun Microsystems, Inc., the palm pilot computing device and other personal digital assistants, Internet ready cellular phones and other Internet computing devices, and in platform independent computing environments, such as those which utilize the Java technologies also developed by Sun Microsystems, Inc.

The mass storage 1312 may include both fixed and removable media, such as magnetic, optical or magnetic optical storage systems or any other available mass storage technology. Bus 1318 may contain, for example, thirty-two address lines for addressing video memory 1314 or main memory 1315. The system bus 1318 also includes, for example, a 32-bit data bus for transferring data between and among the components, such as processor 1313, main memory 1315, video memory 1314 and mass storage 1312. Alternatively, multiplex data/address lines may be used instead of separate data and address lines.

In one embodiment of the invention, the processor 1313 is a SPARC microprocessor from Sun Microsystems, Inc., a microprocessor manufactured by Motorola, such as the 680X0 processor, or a microprocessor manufactured by Intel, such as the 80X86 or Pentium processor. However, any other suitable microprocessor or microcomputer may be utilized. Main memory 1315 is comprised of dynamic random access memory (DRAM). Video memory 1314 is a dual-ported video random access memory. One port of the video memory 1314 is coupled to video amplifier 1316. The video amplifier 1316 is used to drive the cathode ray tube (CRT) raster monitor 1317. Video amplifier 1316 is well known in the art and may be implemented by any suitable apparatus. This circuitry converts pixel data stored in video memory 1314 to a raster signal suitable for use by monitor 1317. Monitor 1317 is a type of monitor suitable for displaying graphic images.

Computer 1301 can send messages and receive data, including program code, through the network(s), network link 1321, and communication interface 1320. In the Internet example, remote server computer. 1326 might transmit a requested code for an application program through Internet 1325, ISP 1324, local network 1322 and communication interface 1320. The received code may be executed by processor 1313 as it is received, and/or stored in mass storage 1312, or other non-volatile storage for later execution. In this manner, computer 1300 may obtain application code in the form of a carrier wave. Alternatively, remote server computer 1326 may execute applications using processor 1313, and utilize mass storage 1312, and/or video memory 1315. The results of the execution at server 1326 are then transmitted through Internet 1325, ISP 1324, local network 1322 and communication interface 1320. In this example, computer 1301 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method and apparatus for configuration using a portable electronic configuration device is described in conjunction with one or more specific embodiments. The invention is defined by the following claims and their full scope an equivalents.

What is claimed is:

1. A method for configuring a device comprising:

designating a primary display unit;

obtaining a size and dimensions of a multi-headed display;

attaching a portable configuration device to a secondary display unit, wherein said portable configuration device is configured to cause said secondary display unit to send one or more configuration data items to a server coupled to said secondary display unit; and configuring said secondary display unit by said server using said configuration data items;

wherein said primary and secondary display units are configured by said server as part of said multi-headed display; and wherein said secondary display unit is configured by said server with said primary display unit in accordance with a fixed topological ordering.

2. The method of claim 1, wherein said server is a thin client server.

3. A method for configuring a device comprising:

designating a primary display unit;

obtaining a size and dimensions of a multi-headed display;

attaching a portable configuration device to a secondary display unit, wherein said portable configuration device is configured to cause said secondary display unit to send one or more configuration data items to a server coupled to said secondary display unit; and configuring said secondary display unit by said server using said configuration data items;

wherein said primary and secondary display units are configured by said server as part of said multi-headed display; and wherein said multi-headed display is part of a thin client topology for displaying a persistent thin client session.

4. The method of claim 3 wherein said primary and secondary display units of said multi-headed display are organized into one or more rows.

5. A configuration device comprising:

a first display unit wherein said first display unit is to be configured;

a second display unit having a controlling user interface for a multi-headed display;

a server wherein said server couples to said first display unit wherein said server is configured to configure said first display unit using one or more configuration data items; and a portable configuration device wherein said portable configuration device is attached to said first display unit wherein said portable configuration device is configured to cause said first display unit to send said configuration data items to said server for configuring said first display unit;

wherein said first and second display units are configured by said server as part of said multi-headed display; and wherein said first display unit is configured by said server with said second display unit in accordance with a fixed topological ordering.

6. The configuration device of claim 5 wherein said server is a thin client server.

7. A configuration device comprising:
 a first display unit wherein said first display unit is to be configured;
 a second display unit having a controlling user interface for a multi-headed display;
 a server wherein said server couples to said first display unit wherein said server is configured to configure said first display unit using one or more configuration data items; and
 a portable configuration device wherein said portable configuration device is attached to said first display unit wherein said portable configuration device is configured to cause said first display unit to send said configuration data items to said server for configuring said first display unit;
 wherein said first and second display units are configured by said server as part of said multi-headed display; and
 wherein said multi-headed display is part of a thin client topology for displaying a persistent thin client session.

8. The configuration device of claim 7 wherein said first and second display units of said multi-headed display are organized into one or more rows.

9. The configuration device of claim 7, further comprising a local area network (LAN), wherein said server is coupled to said first display unit via said LAN.

10. The configuration device of claim 7 wherein said server provides a computation power for said first display unit and a state maintenance for said first display unit.

11. The configuration device of claim 10 wherein said first display unit is a stateless device, wherein said server provides a persistent session to a user of said multi-headed display, and wherein said first display device displays a part of said persistent session.

12. A computer program product comprising:
 a computer usable medium having computer readable program code embodied therein configured for configuring a display unit, comprising:
  computer readable code configured to cause a computer to configure said display unit using one or more configuration data items at a server; and
  computer readable code configured to cause a computer to cause said display unit to transmit said configuration data items to said server when a portable configuration device is attached to said display unit;
  wherein said display unit is part of a multi-headed display and wherein one or more unconfigured display units of said multi-headed display are organized with said display unit at said server into one or more rows, further comprising computer readable code configured to cause a computer to configure said unconfigured display units with said display unit at said server in accordance with a fixed topological ordering.

13. The computer program product of claim 12 wherein said multi-headed display is part of a thin client topology for displaying a persistent thin client session.

* * * * *